(12) United States Patent
Cao et al.

(10) Patent No.: US 11,100,361 B1
(45) Date of Patent: Aug. 24, 2021

(54) METHOD AND APPARATUS FOR PROCESSING FEATURE POINT MATCHING RESULT

(71) Applicant: GOERTEK INC., Shandong (CN)

(72) Inventors: Weiyu Cao, Weifang (CN); Xiang Chen, Weifang (CN); Dachuan Zhao, Weifang (CN)

(73) Assignee: GOERTEK INC., Weifang (CN)

( * ) Notice: Subject to any disclaimer, the term of this patent is extended or adjusted under 35 U.S.C. 154(b) by 96 days.

(21) Appl. No.: 16/620,790

(22) PCT Filed: Jul. 24, 2018

(86) PCT No.: PCT/CN2018/096866
§ 371 (c)(1),
(2) Date: Dec. 9, 2019

(87) PCT Pub. No.: WO2019/024723
PCT Pub. Date: Feb. 7, 2019

(30) Foreign Application Priority Data

Aug. 1, 2017 (CN) .......................... 201710648107.0

(51) Int. Cl.
*G06K 9/62* (2006.01)
*G06K 9/03* (2006.01)

(52) U.S. Cl.
CPC .............. *G06K 9/6211* (2013.01); *G06K 9/03* (2013.01); *G06K 9/6261* (2013.01)

(58) Field of Classification Search
None
See application file for complete search history.

(56) References Cited

U.S. PATENT DOCUMENTS 7,321,370 B2 * 1/2008 Ishiyama ........... G06K 9/00268
345/423
7,412,427 B2 * 8/2008 Zitnick ................ G06K 9/6211
706/20

(Continued)

FOREIGN PATENT DOCUMENTS

CN 201378656 Y 1/2010
CN 102385750 A 3/2012

(Continued)

OTHER PUBLICATIONS

Office Action in CN Application 201710648107.0 dated Oct. 15, 2019.
ISR in PCT Application PCT/CN2018/088525 dated Aug. 1, 2017.

*Primary Examiner* — Anand P Bhatnagar
(74) *Attorney, Agent, or Firm* — Maschoff Brennan

(57) ABSTRACT

Disclosed are a method and an apparatus for processing feature point matching result, the first image and the second image are placed reversely, and the matching feature point pair between the first image and the second image is determined by using the feature point matching algorithm; the straight-line equation between each of the feature point pair is made mathematically, and the intersection between each straight line and other straight line is determined; the valid intersection group and the geometric center point thereof are determined according to the distance between each of the intersection and other intersection; and the judgment area of the feature point pair is determined according to the geometric center point, and whether the feature point pair is a correct matching result or not is determined according to whether a straight line between the feature point pair passes through the judgment area or not.

10 Claims, 3 Drawing Sheets

(56) References Cited

U.S. PATENT DOCUMENTS

| | | | | |
|---|---|---|---|---|
| 8,532,402 | B2* | 9/2013 | Medasani | G06T 7/33 382/225 |
| 10,198,865 | B2* | 2/2019 | Kezele | H04N 13/156 |
| 2004/0225472 | A1* | 11/2004 | Kraft | G06K 9/6211 702/150 |
| 2007/0179921 | A1* | 8/2007 | Zitnick | G06K 9/6211 706/20 |
| 2008/0240492 | A1* | 10/2008 | Ohira | G06K 9/4671 382/100 |
| 2008/0292189 | A1* | 11/2008 | Morimoto | G06K 9/6211 382/181 |
| 2010/0189342 | A1* | 7/2010 | Parr | G06K 9/00275 382/154 |
| 2014/0211989 | A1* | 7/2014 | Ding | G06K 9/6211 382/103 |
| 2015/0199585 | A1 | 7/2015 | Oh et al. | |
| 2016/0013643 | A1* | 1/2016 | Park | H02J 1/00 713/300 |
| 2018/0144458 | A1* | 5/2018 | Xu | G06T 7/70 |
| 2018/0365837 | A1* | 12/2018 | Fukuoka | G06K 9/00449 |

FOREIGN PATENT DOCUMENTS

| | | |
|---|---|---|
| CN | 102385750 B | 7/2013 |
| CN | 104778682 A | 7/2015 |
| CN | 107480710 A | 12/2017 |
| JP | 2013178656 A | 9/2013 |
| JP | 5955028 B2 | 7/2016 |
| KR | 20150084574 A | 7/2015 |

* cited by examiner

METHOD AND APPARATUS FOR PROCESSING FEATURE POINT MATCHING RESULT

CROSS-REFERENCE TO RELATED APPLICATIONS

The present disclosure relates to Chinese Patent Application No. 201710648107.0, filed on Aug. 1, 2017, entitled with "a method and an apparatus for processing feature point matching result", which is hereby incorporated by reference in its entirety.

FIELD

The present disclosure relates to the technical field of image feature matching in computer vision, and in particular to a method and an apparatus for processing feature point matching result.

BACKGROUND

Feature matching technology has important applications in the fields of image retrieval, object recognition, video tracking, and augmented reality. At present, the existed image feature point matching methods mainly include methods of constructing matching descriptors based on local texture information, for example, SIFT, SURF, GLOH and other matching descriptors. This method mainly uses feature local texture information for feature point matching, firstly determining the support area for the feature point, then dividing the support area into a series of fixed-shaped sub-areas, and finally representing the image texture information contained in each sub-area as a vector and constituting the matching descriptor.

This method is frequently used in practical applications because it is simply and easy to implement. However, there are common error problems in this method: scale error generated by scale selection to achieve scale invariance; main direction error generated by estimation the main direction to achieve rotation invariance; and boundary error generated by sub-area division of fixed position. The existence of three kinds of errors affects the resolving power of the descriptor, and the matching effect is poor especially in the case where there is deformation in the image.

Therefore, there is an urgent need for a method to further verify the correctness of the feature point matching result.

SUMMARY

In order to solve the above problems, the present disclosure provides a method and an apparatus for processing feature point matching result, which may quickly and easily verify the accuracy of feature point matching result.

The present disclosure provides a method for processing feature point matching result, including:

determining a matching feature point pair between a first image and a second image by a feature point matching algorithm, where the first image and the second image are placed reversely;

making a straight-line equation between each of the feature point pair, and determining an intersection between each straight line and other straight line;

determining a valid intersection group and a geometric center point of the valid intersection group according to a distance between each of the intersection and other intersection;

determining a judgment area of the feature point pair according to the geometric center point; and determining whether the feature point pair is a correct matching result or not according to whether a straight line between the feature point pair passes through the judgment area or not.

Optionally, where the making the straight-line equation between the each of the feature point pair, and determining the intersection between the each straight line and the other straight line, includes:

making the straight line between the each of the feature point pair, and calculating the straight-line equation of the each straight line; and determining the intersection between the each straight line according to each of the straight-line equation.

Optionally, where the determining the valid intersection group according to the distance between each of the intersection and the other intersection, includes:

in randomly selected N intersection, calculating the distance between the each of the intersection and the other N−1 intersection according to a coordinate of the each of the intersection;

if there is M distance that is less than a preset distance threshold in the obtained N−1 distance between the intersection, and M/N−1 is greater than or equal to a first ratio threshold, determining the intersection as the valid intersection; and forming the valid intersection group by all valid intersection in the selected N intersection.

Optionally, where the determining the geometric center point of the valid intersection group, includes:

if there is K valid intersection in the valid intersection group formed by all valid intersection in the selected N intersection, and K/N is greater than or equal to a second ratio threshold, determining the geometric center point of the valid intersection group formed by the K valid intersection according to the K valid intersection; and if K/N is less than the second ratio threshold, randomly reselecting N intersection to form the valid intersection group, until there is K valid intersection in the valid intersection group formed by all valid intersection in the reselected N intersection, and K/N is greater than or equal to the second ratio threshold.

Optionally, where the determining the judgment area of the feature point pair according to the geometric center point, includes:

setting the judgment area of the feature point pair according to a preset parameter by taking the geometric center point as a center, where the judgment area includes a rectangular area, a circular area or an elliptical area, and a corresponding parameter includes length, width, radius and/or diagonal length.

Optionally, where the determining whether the feature point pair is the correct matching result or not according to whether the straight line between the feature point pair passes through the judgment area or not, includes:

if the straight line between the feature point pair passes through the judgment area, determining that the feature point pair is a correct matching result;

if the straight line between the feature point pair does not pass the judgment area, determining that the feature point pair is a wrong matching result, and deleting the wrong matching result.

Optionally, where the determining the matching feature point pair between the first image and the second image by the feature point matching algorithm, includes:

determining feature point support areas of the first image and the second image respectively;

dividing the feature point support areas into a plurality of sub-areas with a fixed shape;

representing image texture information contained in each of the sub-areas as a vector and composing a matching descriptor; and matching and obtaining the matching feature point pair corresponding to one-to-one correspondence between the first image and the second image according to the matching descriptor.

The present disclosure further provides an apparatus for processing feature point matching result, including:

a first determining module, configured to determine a matching feature point pair between a first image and a second image by a feature point matching algorithm, where the first image and the second image are placed reversely;

a second determining module, configured to make a straight-line equation between each of the feature point pair, and determine an intersection between each straight line and other straight line;

a third determining module, configured to determine a valid intersection group and a geometric center point of the valid intersection group according to a distance between each of the intersection and other intersection;

a fourth determining module, configured to determine a judgment area of the feature point pair according to the geometric center point; and a fifth determining module, configured to determine whether the feature point pair is a correct matching result or not according to whether a straight line between the feature point pair passes through the judgment area or not.

Optionally, where the third determining module is specifically configured to:

in randomly selected N intersection, calculate the distance between the each of the intersection and the other N−1 intersection according to a coordinate of the each of the intersection;

if there is M distance that is less than a preset distance threshold in the obtained N−1 distance between the intersection, and M/N−1 is greater than or equal to a first ratio threshold, determine the intersection as the valid intersection, and form the valid intersection group by all valid intersection in the selected N intersection;

if there is K valid intersection in the valid intersection group formed by all valid intersection in the selected N intersection, and K/N is greater than or equal to a second ratio threshold, determine the geometric center point of the valid intersection group formed by the K valid intersection according to the K valid intersection; and if K/N is less than the second ratio threshold, randomly reselect N intersection to form the valid intersection group, until there is K valid intersection in the valid intersection group formed by all valid intersection in the reselected N intersection, and K/N is greater than or equal to the second ratio threshold.

Optionally, where the fourth determining module is specifically configured to:

set the judgment area of the feature point pair according to a preset parameter by taking the geometric center point as a center, where the judgment area includes a rectangular area, a circular area or an elliptical area, and a corresponding parameter includes length, width, radius and/or diagonal length;

the fifth determining module is specifically configured to:

if the straight line between the feature point pair passes through the judgment area, determine that the feature point pair is a correct matching result;

if the straight line between the feature point pair does not pass the judgment area, determine that the feature point pair is a wrong matching result, and delete the wrong matching result.

In the embodiment of the present disclosure, firstly, the first image and the second image are placed reversely, and the matching feature point pair between the first image and the second image can be determined quickly by using the feature point matching algorithm; secondly, the straight-line equation between each of the feature point pair is made by using the mathematical expression, and the intersection between each straight line and other straight line is determined quickly; and then the valid intersection group and the geometric center point of the valid intersection group can be determined according to the distance between each of the intersection and other intersection; finally, the judgment area of the feature point pair is determined according to the geometric center point, and whether the feature point pair is a correct matching result or not is determined according to whether a straight line between the feature point pair passes through the judgment area or not. It solves the problem that the correctness of the matching feature point can only be detected by the naked eye after the matching feature point is completed according to the existing feature point matching algorithm, and a large error is existed. However, the technical solution of the present disclosure can quickly determine the correctness of the feature point matching result by mathematical expression. The present disclosure can determine a judgment area according to the center point of the valid intersection group, and can adjust the verification correctness of the matching feature point by the size of the judgment area. Therefore, the matching feature point can be verified 100% correctly by the verification method of the present disclosure.

BRIEF DESCRIPTION OF THE DRAWINGS

The drawings described herein are intended to provide a further understanding of the present disclosure, and are intended to be a part of the present disclosure. The example embodiment of the present disclosure and the description thereof are for explaining the present disclosure and do not constitute a limitation to the present disclosure. In the drawings.

DETAILED DESCRIPTION OF EXAMPLE EMBODIMENTS

For making the purposes, technical solutions and advantages of the embodiments of the present invention clearer, the technical solutions in the embodiments of the present invention will be clearly and completely described below in combination with the drawings in the embodiments of the present invention. It is apparent that the described embodiments are not all embodiments but part of embodiments of the present invention. All other embodiments obtained by those of ordinary skill in the art on the basis of the embodiments in the present invention without creative work shall fall within the scope of protection of the present invention.

Figure 1:
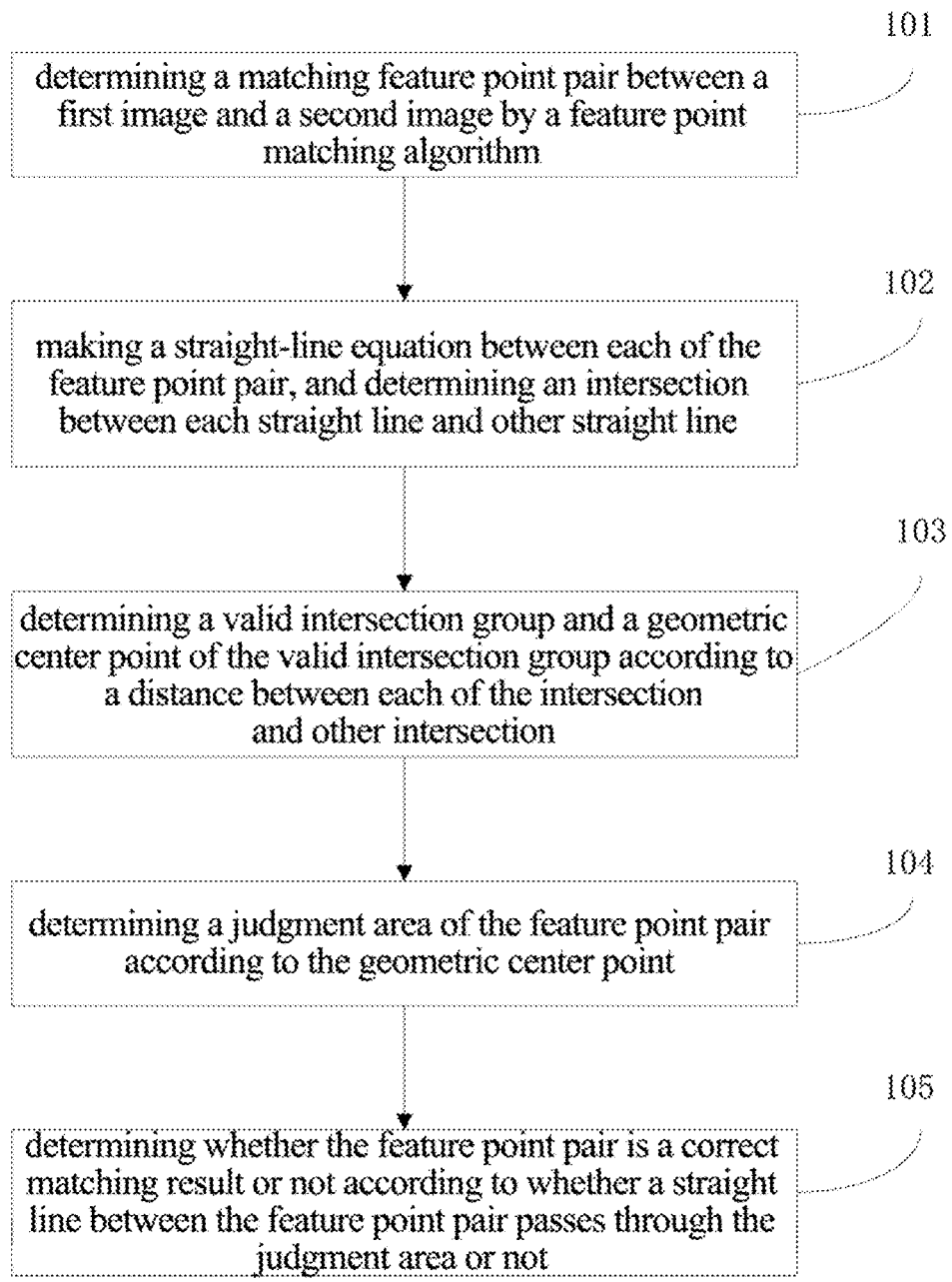
FIG. 1 is a schematic flowchart of a method for processing feature point matching result according to an embodiment of the present disclosure.

FIG. 1 is a schematic flowchart of a method for processing feature point matching result according to an embodiment of the present disclosure. As shown in FIG. 1:

101. a matching feature point pair is determined between a first image and a second image by a feature point matching algorithm.

Firstly, the first image and the second image are placed in the same screen, and then one of the first image and the second image (the first image or the second image) is rotated by 180 degrees. The specific matching includes:

feature point support areas of the first image and the second image are determined respectively;

the feature point support areas are divided into a plurality of sub-areas with a fixed shape;

image texture information contained in each of the sub-areas is represented as a vector and a matching descriptor is composed; and the matching feature point pair corresponding to one-to-one correspondence between the first image and the second image is matched and obtained according to the matching descriptor.

Since the feature point matching algorithm is a local feature of the image, it has good invariance to translation, rotation, scaling, brightness variation, shield, noise and so on, and maintains a certain degree of stability for visual change and affine transformation, which is suitable for fast and accurate matching in the massive feature database. Even a small number of objects can generate a large number of SIFT feature vectors, which is relatively fast. Therefore, in the embodiment of the present disclosure, the feature point matching algorithm is run on the first image and the second image, where the feature point matching algorithm includes, for example, a matching descriptor sub-method such as SIFT, SURF, GLOH, etc., mainly by using feature local texture information to perform the feature point matching. Firstly, the support area is determined for the feature point. Then the support area is divided into a series of sub-areas with a fixed shape. And finally the image texture information contained in each of the sub-area is represented as a vector and a matching descriptor is composed, and the matching result, that is, the feature point pair, corresponding to one-to-one correspondence between the first image and the second image is matched and obtained according to the matching descriptor.

102. a straight-line equation between each of the feature point pair is made, and an intersection between each straight line and other straight line is determined.

Since the straight-line equation can represent any straight line in the plane, the relationship between x and y can be quickly and accurately obtained, and the operation speed is relatively fast. Therefore, in the embodiment of the present disclosure, the straight-line equation regarding the straight line between each of the feature point pair is calculated, and the intersection between each straight line and the other straight line is determined.

Figure 2:
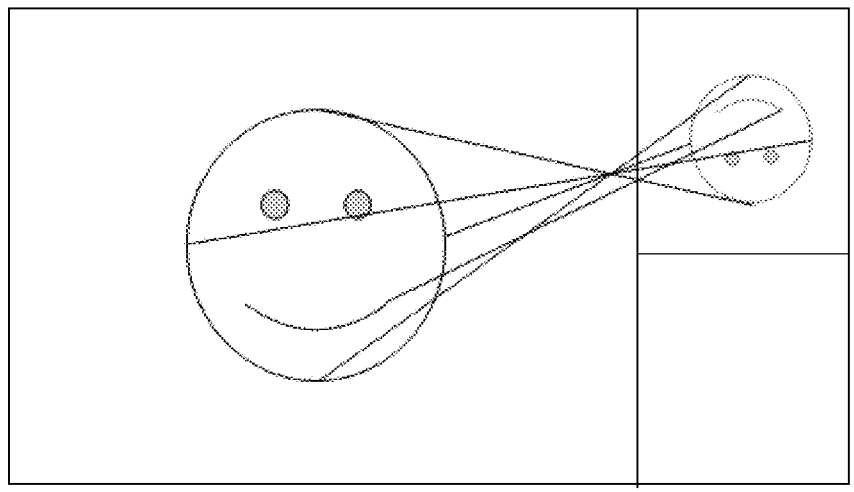
FIG. 2 is a schematic diagram of a straight line intersection point of a feature point pair according to an embodiment of the present disclosure.

FIG. 2 is a schematic diagram of a straight line intersection point of a feature point pair according to an embodiment of the present disclosure, as shown in FIG. 2, assuming that a feature point (X1, Y1) in the first image and a feature point (X2, Y2) in the second image are the feature point pair, the straight-line equation between the feature point (X1, Y1) and the feature point (X2, Y2) is $$\frac{y - y_1}{x - x_1} = \frac{y_2 - y_1}{x_2 - x_1};$$

and assuming the straight-line equations of the two feature points respectively are $y=k_1x+b_1$ and $y=k_2x+b_2$, the intersection is $$\left(\frac{b_2 - b_1}{k_1 - k_2}, \frac{k_1 b_2 - k_2 b_1}{k_1 - k_2}\right).$$

103. a valid intersection group and a geometric center point of the valid intersection group are determined according to a distance between each of the intersection and other intersection.

In an optional implementation manner, the determining the valid intersection group according to the distance between each of the intersection and other intersection includes:

in randomly selected N intersection, the distance between the each of the intersection and the other N−1 intersection is calculated according to a coordinate of the each of the intersection;

if there is M distance that is less than a preset distance threshold in the obtained N−1 distance between the intersection, and M/N−1 is greater than or equal to a first ratio threshold, the intersection is determined as the valid intersection; and the valid intersection group is formed by all valid intersection in the selected N intersection.

In an optional implementation manner, the determining the geometric center point of the valid intersection group includes:

if there is K valid intersection in the valid intersection group formed by all valid intersection in the selected N intersection, and K/N is greater than or equal to a second ratio threshold, the geometric center point of the valid intersection group formed by the K valid intersection is determined according to the K valid intersection; and if K/N is less than the second ratio threshold, N intersection is randomly reselected to form the valid intersection group, until there is K valid intersection in the valid intersection group formed by all valid intersection in the reselected N intersection, and K/N is greater than or equal to the second ratio threshold.

It should be noted that, when calculating the distance between each of the intersection and all other intersection in the above step, it is necessary to preset a distance threshold a, a first ratio threshold b % (usually can be set to 90% or 80%), and a second ratio threshold c % (usually can be set to 70% or 60%).

The setting of the distance threshold a is inversely proportional to the accuracy requirement of the feature point matching result that needs to be implemented by the present disclosure. It is assumed that the higher the accuracy requirement of the feature point matching result required by the present disclosure, the smaller the value of the distance threshold a may be. The lower the accuracy requirement of the feature point matching result that the present disclosure needs to achieve, the larger the value of the distance threshold a can be.

According to the above step, for example, a number of straight-line equations (may be 5 or 10) are randomly taken, the intersections between the straight-line equations are calculated by pairs, all intersection coordinates are recorded, a distance threshold a between the intersections is pre-set, and the distances between each of the intersection and all other intersection points are calculated. If a distance that is greater than first ratio threshold b % is less than the distance threshold a, a corresponding intersection is recorded as a valid intersection; if a quantity proportion (the number of the valid intersection/the number of the intersection selected in the present time) of the valid intersection generated by the straight-line equations selected in the present time is less than the second ratio threshold value c %, a group of straight-line equations is reselected to determine the valid intersection; and if a quantity proportion of the valid intersections generated by the straight-line equations selected in the present time is greater than or equal to the second ratio threshold value c %, all valid intersections are recorded to generate a valid intersection group and calculates the geometric center point of the valid intersection group.

It should be noted that, when calculating the geometric center point of the valid intersection group, the average value of each valid intersection coordinate may be determined as the coordinate of the geometric center point. For example, if the coordinates of the three valid intersections are (9, 11), (10, 10) and (11, 9), then the coordinate of the geometric center point of the three valid intersections is ((9+10+11)/3, (11+10+9)/3).

104. a judgment area of the feature point pair is determined according to the geometric center point;

Specifically, the judgment area of the feature point pair is set according to a preset parameter by taking the geometric center point as a center, where the judgment area comprises a rectangular area, a circular area or an elliptical area, and a corresponding parameter comprises length, width, radius and/or diagonal length. The parameters such as the length, the width, the radius and/or the diagonal length may be determined according to the accuracy requirement of the feature point matching result that needs to be implemented by the present disclosure. It is assumed that the accuracy requirement of the feature point matching result required by the present disclosure is higher, the parameters such as the length, the width, the radius and/or the diagonal length may be smaller. Conversely, when the accuracy requirement of the feature point matching result required by the present disclosure is lower, the parameters such as the length, the width, the radius and/or the diagonal length may be bigger. Referring specifically to the rectangular judgment area shown in FIG. 3, in order to achieve high-precision feature point matching result, the rectangular judgment area shown in FIG. 3 may be set relatively small.

105. whether the feature point pair is a correct matching result or not is determined according to whether a straight line between the feature point pair passes through the judgment area or not.

In the embodiment of the present disclosure, if a straight line between feature point pair passes through the judgment area, it is determined that the feature point pair is a correct matching result; if the straight line between the feature point pair does not pass the judgment area, it is determined the feature point pair is not the correct matching result.

Figure 3:
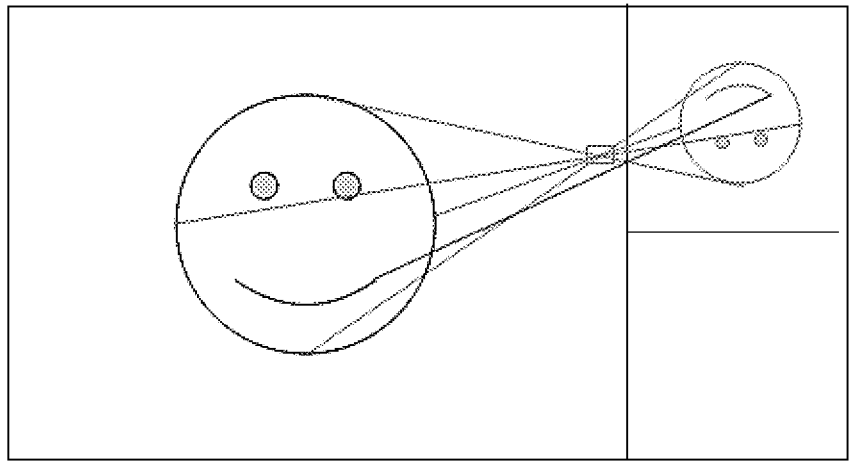
FIG. 3 is a schematic diagram of a judgment area according to an embodiment of the present disclosure.
Figure 4:
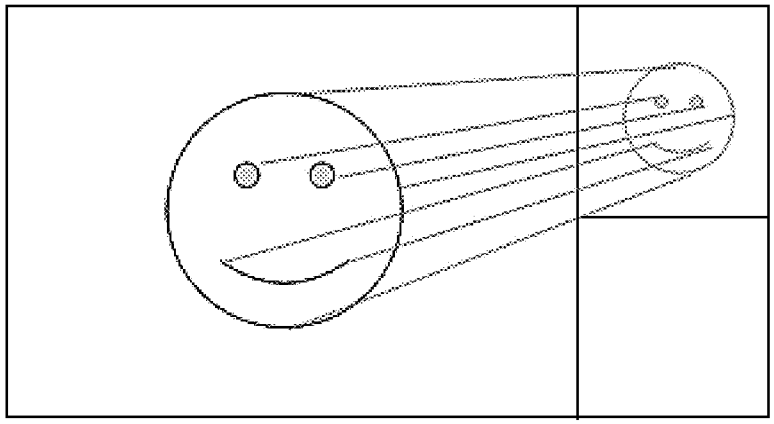
FIG. 4 is a schematic diagram of a judgment of a feature point matching result in the prior art.

FIG. 4 is a schematic diagram of a judgment of a feature point matching result in the prior art. As shown in FIG. 4, when the first image and the second image are placed in the same picture in a forward direction, if the feature point matching result is correct, the straight line formed by the matching point pair should be parallel or gradually gradual, as shown in FIG. 3. However, this parallel or a regular gradient is not easy to express mathematically, resulting in the problem of judgment difficult or judgment incorrect of the feature point matching result.

In the embodiment of the present disclosure, as shown in FIG. 3, the first image and the second image are placed in the same picture, and then one of the first image and the second image (the first image or the second image) is rotated 180 degrees. In theory, all straight lines of correct matching feature point pair will intersect at an intersection point. Therefore, it is easy to calculate the intersection between two straight line equations mathematically (such as the straight line equation between feature point pair). However, in the actual situation, due to the slight error of the feature point coordinate, the intersection of the straight line of all correct matching feature point pair may not be an exact point, so a judgment area is determined. When the straight line between the feature point pair passed through the judgment area, it is determined that the feature point pair is a correct matching result; and when the straight line between the feature point pair does not pass through the judgment area, it is determined that the feature point pair is not a correct matching result.

In the embodiment of the present disclosure, firstly, the first image and the second image are placed reversely, and the matching feature point pair between the first image and the second image can be determined quickly by using the feature point matching algorithm; secondly, the straight-line equation between each of the feature point pair is made by using the mathematical expression, and the intersection between each straight line and other straight line is determined quickly; and then the valid intersection group and the geometric center point of the valid intersection group can be determined according to the distance between each of the intersection and other intersection; finally, the judgment area of the feature point pair is determined according to the geometric center point, and whether the feature point pair is a correct matching result or not is determined according to whether a straight line between the feature point pair passes through the judgment area or not. It solves the problem that the correctness of the matching feature point can only be detected by the naked eye after the matching feature point is completed according to the existing feature point matching algorithm, and a large error is existed. However, the technical solution of the present disclosure can quickly determine the correctness of the feature point matching result by mathematical expression. The present disclosure can determine a judgment area according to the center point of the valid intersection group, and can adjust the verification correctness of the matching feature point by the size of the judgment area. Therefore, the matching feature point can be verified 100% correctly by the verification method of the present disclosure.

Figure 5:
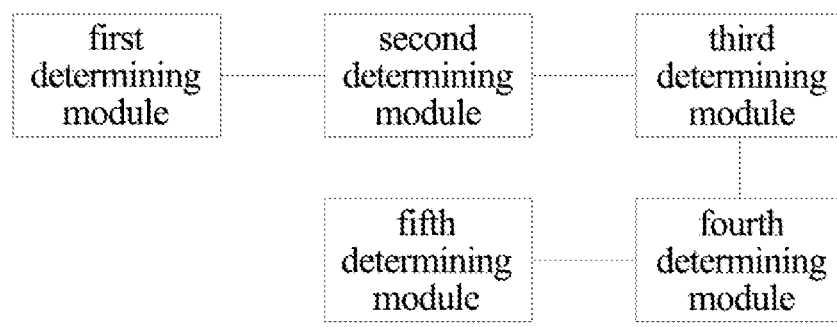
FIG. 5 is a schematic structural diagram of an apparatus for processing feature point matching result according to an embodiment of the present disclosure.

FIG. 5 is a schematic structural diagram of an apparatus for processing feature point matching result according to an embodiment of the present disclosure. As shown in FIG. 5, the apparatus includes:

a first determining module, configured to determine a matching feature point pair between a first image and a second image by a feature point matching algorithm, wherein the first image and the second image are placed reversely;

a second determining module, configured to make a straight-line equation between each of the feature point pair, and determine an intersection between each straight line and other straight line;

a third determining module, configured to determine a valid intersection group and a geometric center point of the valid intersection group according to a distance between each of the intersection and other intersection;

a fourth determining module, configured to determine a judgment area of the feature point pair according to the geometric center point; and a fifth determining module, configured to determine whether the feature point pair is a correct matching result or not according to whether a straight line between the feature point pair passes through the judgment area or not.

Optionally, the second determining module is specifically configured to:

assume that a feature point (X1, Y1) in the first image and a feature point (X2, Y2) in the second image are the feature point pair, the straight-line equation between the feature point (X1, Y1) and the feature point (X2, Y2) is $$\frac{y - y_1}{x - x_1} = \frac{y_2 - y_1}{x_2 - x_1};$$

and assume the straight-line equations of the two feature points respectively are $y = k_1 x + b_1$ and $y = k_2 x + b_2$, the intersection is $$\left( \frac{b_2 - b_1}{k_1 - k_2}, \frac{k_1 b_2 - k_2 b_1}{k_1 - k_2} \right).$$

Optionally, the third determining module is specifically configured to:

in randomly selected N intersection, calculate the distance between the each of the intersection and the other N−1 intersection according to a coordinate of the each of the intersection;

if there is M distance that is less than a preset distance threshold in the obtained N−1 distance between the intersection, and M/N−1 is greater than or equal to a first ratio threshold, determine the intersection as the valid intersection, and form the valid intersection group by all valid intersection in the selected N intersection;

if there is K valid intersection in the valid intersection group formed by all valid intersection in the selected N intersection, and K/N is greater than or equal to a second ratio threshold, determine the geometric center point of the valid intersection group formed by the K valid intersection according to the K valid intersection; and if K/N is less than the second ratio threshold, randomly reselect N intersection to form the valid intersection group, until there is K valid intersection in the valid intersection group formed by all valid intersection in the reselected N intersection, and K/N is greater than or equal to the second ratio threshold.

Optionally, the fourth determining module is specifically configured to:

set the judgment area of the feature point pair according to a preset parameter by taking the geometric center point as a center, wherein the judgment area comprises a rectangular area, a circular area or an elliptical area, and a corresponding parameter comprises length, width, radius and/or diagonal length.

Optionally, the fifth determining module is specifically configured to:

if the straight line between the feature point pair passes through the judgment area, determine that the feature point pair is a correct matching result; and if the straight line between the feature point pair does not pass the judgment area, determine that the feature point pair is a wrong matching result, and delete the wrong matching result.

The apparatus in the embodiment of the present disclosure may be similar to the method shown in the foregoing embodiment, and the implementation principle and technical effect thereof are not described again.

In the embodiment of the present disclosure, the structure of the apparatus for processing feature point matching result includes a processor and a memory. The memory is for storing a program for supporting the apparatus for processing feature point matching result to execute the method for processing feature point matching result shown in FIG. 1, and the processor is for executing a program stored in the memory.

The program includes one or more computer instructions, where the one or more computer instructions are for execution by the processor.

The embodiment of the present disclosure further provides a computer storage medium, which is used for storing a computer software instruction used in the method for processing feature point matching result in the embodiment shown in FIG. 1, where the computer software instruction includes a program for executing the method for processing feature point matching result in the embodiment shown in FIG. 1.

The embodiment of the present disclosure further provides a computer storage medium for storing a computer software instruction for used by the apparatus for processing feature point matching result, where the computer software instruction includes a program involved in the apparatus for processing feature point matching result to execute the method for processing feature point matching result.

Those skilled in the art should know that the embodiment of the present invention may be provided as a method, a system or a computer program product. Therefore, the present invention may adopt a form of pure hardware embodiment, pure software embodiment and combined software and hardware embodiment. Moreover, the present invention may adopt a form of computer program product implemented on one or more computer-available storage media (including, but not limited to, a disk memory, a Compact Disc Read-Only Memory (CD-ROM) and an optical memory) including computer-available program codes.

The present invention is described with reference to flowcharts and/or block diagrams of the method, a device (system) and computer program product according to the embodiment of the present invention. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction apparatus may be generated by the instructions stored in the computer-readable memory, the instruction apparatus realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

In a typical configuration, a computing device includes one or more CPUs, an input/output interface, a network interface and a memory.

The memory may include forms of a volatile memory, Random Access Memory (RAM) and/or non-volatile memory, etc. in computer-readable media, for example, a Read-Only Memory (ROM) or a flash RAM. The memory is an example of the computer-readable medium.

The computer-readable medium includes non-volatile, non-volatile, removable and fixed media and may store information by any method or technology. The information may be a computer-readable instruction, a data structure, a program module or other data. Examples of a computer storage medium includes, but not limited to, a Phase-change RAM (PRAM), a Static RAM (SRAM), a Dynamic RAM (DRAM), a RAM of other types, a ROM, an Electrically Erasable Programmable ROM (EEPROM), a flash memory or other memory technologies, a CD-ROM, a Digital Video Disk (DVD) or other optical memories, a cassette tape, a tape disk memory or other magnetic storage devices or any other non-transmission media, and may be configured to store information accessible for the computing device. It is defined herein that the computer-readable medium does not include transitory media, for example, a modulated data signal and a carrier.

It is also to be noted that terms "include", "contain" or any other variants thereof are intended to include nonexclusive inclusions, thereby ensuring that a process, method, commodity or device including a series of elements not only includes those elements but also includes other elements which are not clearly listed or further includes elements intrinsic to the process, the method, the commodity or the device. Under the circumstance of no more restrictions, an element defined by statement "including a/an" does not exclude existence of another element which is the same in a process, method, commodity or device including the element.

Those skilled in the art should know that the embodiment of the present invention may be provided as a method, a system or a computer program product. Therefore, the present invention may adopt a form of pure hardware embodiment, pure software embodiment and combined software and hardware embodiment. Moreover, the present invention may adopt a form of computer program product implemented on one or more computer-available storage media (including, but not limited to, a disk memory, a Compact Disc Read-Only Memory (CD-ROM) and an optical memory) including computer-available program codes.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A method for processing feature point matching result, comprising:
    determining a matching feature point pair between a first image and a second image by a feature point matching algorithm, wherein the first image and the second image are placed reversely;
    making a straight-line equation between each of the feature point pair, and determining an intersection between each straight line and other straight line;
    determining a valid intersection group and a geometric center point of the valid intersection group according to a distance between each of the intersection and other intersection;
    determining a judgment area of the feature point pair according to the geometric center point; and
    determining whether the feature point pair is a correct matching result or not according to whether a straight line between the feature point pair passes through the judgment area or not.

2. The method according to claim 1, wherein the making the straight-line equation between the each of the feature point pair, and determining the intersection between the each straight line and the other straight line, comprises:
    assuming that a feature point (X1, Y1) in the first image and a feature point (X2, Y2) in the second image are the feature point pair, the straight-line equation between the feature point (X1, Y1) and the feature point (X2, Y2) is $$\frac{y - y_1}{x - x_1} = \frac{y_2 - y_1}{x_2 - x_1};$$

and assuming two straight-line equations are $y = k_1 x + b_1$ and $y = k_2 x + b_2$, the intersection is $$\left( \frac{b_2 - b_1}{k_1 - k_2}, \frac{k_1 b_2 - k_2 b_1}{k_1 - k_2} \right).$$

3. The method according to claim 1, wherein the determining the valid intersection group according to the distance between each of the intersection and the other intersection, comprises:
    in randomly selected N intersection, calculating the distance between the each of the intersection and the other N−1 intersection according to a coordinate of the each of the intersection;
    if there is M distance that is less than a preset distance threshold in the obtained N−1 distance between the intersection, and M/N−1 is greater than or equal to a first ratio threshold, determining the intersection as the valid intersection; and
    forming the valid intersection group by all valid intersection in the selected N intersection.

4. The method of claim 3, wherein the determining the geometric center point of the valid intersection group, comprises:

if there is K valid intersection in the valid intersection group formed by all valid intersection in the selected N intersection, and K/N is greater than or equal to a second ratio threshold, determining the geometric center point of the valid intersection group formed by the K valid intersection according to the K valid intersection; and if K/N is less than the second ratio threshold, randomly reselecting N intersection to form the valid intersection group, until there is K valid intersection in the valid intersection group formed by all valid intersection in the reselected N intersection, and K/N is greater than or equal to the second ratio threshold.

5. The method according to claim 4, wherein the determining the judgment area of the feature point pair according to the geometric center point, comprises:

setting the judgment area of the feature point pair according to a preset parameter by taking the geometric center point as a center, wherein the judgment area comprises a rectangular area, a circular area or an elliptical area, and a corresponding parameter comprises length, width, radius and/or diagonal length.

6. The method according to claim 5, wherein the determining whether the feature point pair is the correct matching result or not according to whether the straight line between the feature point pair passes through the judgment area or not, comprises:

if the straight line between the feature point pair passes through the judgment area, determining that the feature point pair is a correct matching result;

if the straight line between the feature point pair does not pass the judgment area, determining that the feature point pair is a wrong matching result, and deleting the wrong matching result.

7. The method according to claim 1, wherein the determining the matching feature point pair between the first image and the second image by the feature point matching algorithm, comprises:

determining feature point support areas of the first image and the second image respectively;

dividing the feature point support areas into a plurality of sub-areas with a fixed shape;

representing image texture information contained in each of the sub-areas as a vector and composing a matching descriptor; and matching and obtaining the matching feature point pair corresponding to one-to-one correspondence between the first image and the second image according to the matching descriptor.

8. An apparatus for processing feature point matching result, comprising:

a first determining module, configured to determine a matching feature point pair between a first image and a second image by a feature point matching algorithm, wherein the first image and the second image are placed reversely;

a second determining module, configured to make a straight-line equation between each of the feature point pair, and determine an intersection between each straight line and other straight line;

a third determining module, configured to determine a valid intersection group and a geometric center point of the valid intersection group according to a distance between each of the intersection and other intersection;

a fourth determining module, configured to determine a judgment area of the feature point pair according to the geometric center point; and a fifth determining module, configured to determine whether the feature point pair is a correct matching result or not according to whether a straight line between the feature point pair passes through the judgment area or not.

9. The apparatus according to claim 8, wherein the third determining module is specifically configured to:

in randomly selected N intersection, calculate the distance between the each of the intersection and the other N−1 intersection according to a coordinate of the each of the intersection;

if there is M distance that is less than a preset distance threshold in the obtained N−1 distance between the intersection, and M/N−1 is greater than or equal to a first ratio threshold, determine the intersection as the valid intersection, and form the valid intersection group by all valid intersection in the selected N intersection;

if there is K valid intersection in the valid intersection group formed by all valid intersection in the selected N intersection, and K/N is greater than or equal to a second ratio threshold, determine the geometric center point of the valid intersection group formed by the K valid intersection according to the K valid intersection; and if K/N is less than the second ratio threshold, randomly reselect N intersection to form the valid intersection group, until there is K valid intersection in the valid intersection group formed by all valid intersection in the reselected N intersection, and K/N is greater than or equal to the second ratio threshold.

10. The apparatus according to claim 9, wherein the fourth determining module is specifically configured to:

set the judgment area of the feature point pair according to a preset parameter by taking the geometric center point as a center, wherein the judgment area comprises a rectangular area, a circular area or an elliptical area, and a corresponding parameter comprises length, width, radius and/or diagonal length;

the fifth determining module is specifically configured to:

if the straight line between the feature point pair passes through the judgment area, determine that the feature point pair is a correct matching result; and if the straight line between the feature point pair does not pass the judgment area, determine that the feature point pair is a wrong matching result, and delete the wrong matching result.

\* \* \* \* \*